UNITED STATES PATENT OFFICE.

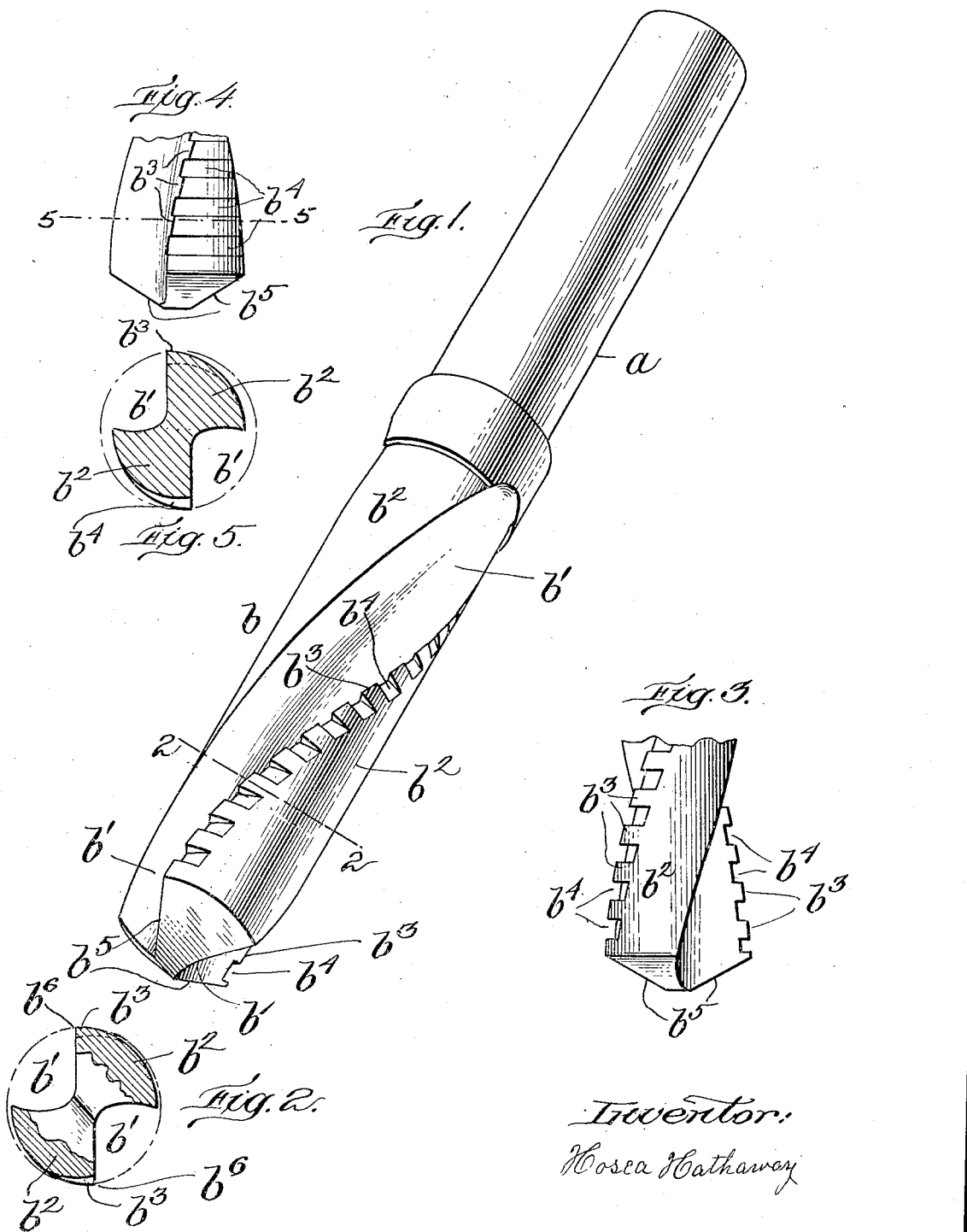

HOSEA HATHAWAY, OF BROOKLINE, MASSACHUSETTS.

BORING AND SLOTTING TOOL.

1,328,430. Specification of Letters Patent. Patented Jan. 20, 1920.

Application filed November 5, 1918. Serial No. 261,248.

*To all whom it may concern:*

Be it known that I, HOSEA HATHAWAY, a citizen of the United States, residing at Brookline, in the county of Norfolk and State of Massachusetts, have invented certain new and useful Improvements in Boring and Slotting Tools, of which the following is a specification.

My invention has for its object to provide a tool adapted to form an elongated slot or kerf in a tree trunk by first boring a round hole therein, and then laterally extending said hole until the trunk is partially or wholly severed.

The invention is embodied in a tool characterized as hereinafter described and claimed.

In the accompanying drawings forming a part of this specification,—

Figure 1 is a perspective view of a tool constructed in accordance with my invention.

Fig. 2 is a section on line 2—2 of Fig. 1.

Fig. 3 is a side view of the outer end portion of the body of the tool shown by Fig. 1.

Figs. 4 and 5 illustrate a modification, Fig. 4 being a side view, and Fig. 5 a section on line 5—5 of Fig. 4.

The same reference characters indicate the same parts in all of the figures.

The body $b$ of my improved tool is elongated and subtantially cylindrical, and is provided with a shank $a$, adapted to be engaged by a chuck or other tool-holder.

In the body $b$ are formed longitudinal grooves $b'$ which are oblique to the axis of the tool, and interrupt the continuity of its periphery, leaving independent peripheral portions $b^2$, which are backed off and eccentric to the axis of the tool, so that each peripheral portion has a higher and a lower longitudinal edge.

The outer ends of the grooves $b'$ intersect the outer end of the tool, which is of approximately conical form, as shown by Figs. 3 and 5, the intersection forming substantially radial cutting edges $b^5$ adapted to bore a round hole in a tree trunk, or other object. The longitudinal edges of the grooves intersect the peripheral portions $b^2$, and form cutting angles $b^6$ at the higher edges of said portions.

Said cutting angles are subdivided by notches $b^4$ formed in said peripheral portions, into rows of spaced apart hole-elongating teeth $b^3$ which are oblique to the axis of the tool, and have cutting edges formed by the portions of the above-described angles $b^6$, which are left between the notches. Said cutting edges are equidistant from the axis of the tool, and the backs of the teeth are formed by said peripheral portions, and are eccentric to said axis, so that a clearance is provided for each tooth.

When the tool has been moved longitudinally, and has bored a round hole of the desired depth, it may be moved laterally to cause the teeth $b^3$ to elongate the hole and convert it into an oblong slot or kerf, of any desired length. The tool is adapted for use, therefore, in felling a standing tree trunk, by first boring a round hole therein and then converting said hole into a kerf, which may be extended until the trunk is sufficiently weakened.

The obliquely extending rows of teeth $b^3$ are adapted to rapidly elongate the hole initally formed. The teeth of each row are in staggered relation to the teeth of the other row, as shown by Fig. 3, so that the teeth of one row are in the same transverse planes as the notches between the teeth of the other row. The hole-elongating duty is, therefore, divided between the two rows of teeth, the teeth of each row removing material left by the teeth of the other row.

In the modification shown by Figs. 4 and 5, the notches $b^4$ extend clear across the peripheral portions $b^2$, and the bottom of each notch is concentric with the axis of the tool. The back of each tooth is eccentric to the axis of the tool, while the bottom of each notch is concentric therewith.

As will be clear, my improved tool may be used for either drilling holes, or for cutting laterally through the work to form the drilled hole into a slot, or otherwise enlarge it.

I claim:

An elongated boring and slotting tool of substantially cylindrical form, having longitudinal grooves oblique to the axis of the tool and separated by independent peripheral portions which are backed off and eccentric to the axis of the tool, so that each peripheral portion has a higher and a lower longitudinal edge, the outer ends of said grooves intersecting the end of the tool and forming cutting edges adapted to bore a round hole, the longitudinal edges of said grooves intersecting the said peripheral portions and forming cutting angles at the higher edges thereof, said cutting angles being subdivided by notches formed in said peripheral portions, into rows of spaced apart hole-elongating teeth, which are oblique to the axis of the tool, and have cutting edges equidistant from the axis of the tool and backs eccentric to said axis, the hole-elongating teeth of each row being staggered relatively to the teeth of the other row, so that the hole-elongating duty is divided between the rows of teeth.

In testimony whereof I have affixed my signature.

HOSEA HATHAWAY.